United States Patent [19]
Machell et al.

[11] Patent Number: 4,955,558
[45] Date of Patent: Sep. 11, 1990

[54] REACTION CONTROL SYSTEM

[75] Inventors: Anthony Machell; Peter G. Foulsham, both of Stevenage, England

[73] Assignee: British Aerospace Public Limited Company, London, England

[21] Appl. No.: 308,460

[22] Filed: Feb. 10, 1989

[30] Foreign Application Priority Data

Feb. 11, 1988 [GB] United Kingdom ................. 8803164

[51] Int. Cl.$^5$ ............................................. F42B 10/66
[52] U.S. Cl. ................................................ 244/3.22
[58] Field of Search ............................ 244/3.21, 3.22; 239/265.19, 265.25

[56] References Cited

U.S. PATENT DOCUMENTS

| | | | |
|---|---|---|---|
| 4,085,909 | 4/1978 | East et al. | 244/3.22 |
| 4,637,572 | 1/1987 | Metz | 244/3.22 |
| 4,747,568 | 5/1988 | Carrigan | 244/3.22 |

FOREIGN PATENT DOCUMENTS 0244971 11/1987 European Pat. Off. .

OTHER PUBLICATIONS

U.K. Search Report.

*Primary Examiner*—Charles T. Jordan
*Attorney, Agent, or Firm*—Nixon & Vanderhye

[57] ABSTRACT

A projectile reaction control system includes a nozzle assembly in which the efflux exhausted thereby may be controlled in a continuously variable fashion. In one example control is by means of a slidable piston so that the thrust developed by the nozzle assembly is substantially linearly dependent on the displacement of the piston, whereby the reaction control system may be controlled by an autopilot with little or no modification.

9 Claims, 5 Drawing Sheets

REACTION CONTROL SYSTEM

BACKGROUND OF THE INVENTION

This invention relates to a reaction control system for a projectile, for example a missile or a mortar round and to projectiles including such systems.

Directional control of missiles in flight may be achieved either aerodynamically using movable control surfaces, e.g. fins, or by using a reaction control system in which control thrusts are generated by emitting a reaction gas transversely of the missile. In the known examples of the latter method of control it is usual to employ single shot squibs or pulsed units. This is believed to limit the degree and accuracy of control and requires the missile autopilot to be specifically designed to deal with this method of control. In these systems the magnitude of the thrust remains generally the same; the only control available is control of the length of the impulse. Studies conducted by the applicants show that there is a need for a reaction control system which produces a thrust whose magnitude may be varied continuously. Furthermore, there is a need for such a system in which the relationship between the movement of the member controlling the reaction control system and the thrust thereby is generally compatible with that of a fin assembly so that the reaction system may be controlled by an existing autopilot without major modification.

SUMMARY OF THE INVENTION

According to one aspect of the invention, there is provided a reaction control system for a projectile, comprising a plurality of nozzles arranged in use to exhaust fluid including a component directed generally transversely with respect to the main body axis of the projectile, and control means associated with each nozzle respectively and operable to control the magnitude of the thrust generate thereby in a continuously variable manner.

The invention also extends to a projectile including the reaction control system as defined above.

In a further aspect of the invention, there is provided a projectile including a reaction control system as defined above capable of effecting control in each of the control senses of the projectile, aerodynamic control surface means movable for effecting control in each of the control senses of the projectile, and autopilot means for effecting control simultaneously via said reaction control system and said aerodynamic control surface means.

A preferred embodiment of the system is particularly useful where a projectile requires the control function exerted by the aerodynamic fins either to be augmented by the reaction control system, e.g. to execute a terminal manoeuvre, or to be replaced thereby when the projectile is travelling too slowly for the aerodynamic fins to be effective, e.g. at launch.

BRIEF DESCRIPTION OF THE DRAWINGS

The invention will now be described by way of non-limiting example, reference being made to the accompanying drawings, in which.

DETAILED DESCRIPTION OF PREFERRED EMBODIMENTS

Referring to the Figures, the illustrated embodiment of a reaction control system is intended to be operated in conjuction with a fin assembly by an autopilot. The reaction control system may however also be used in missiles which do not incorporate a fin assembly.

Figure 1:
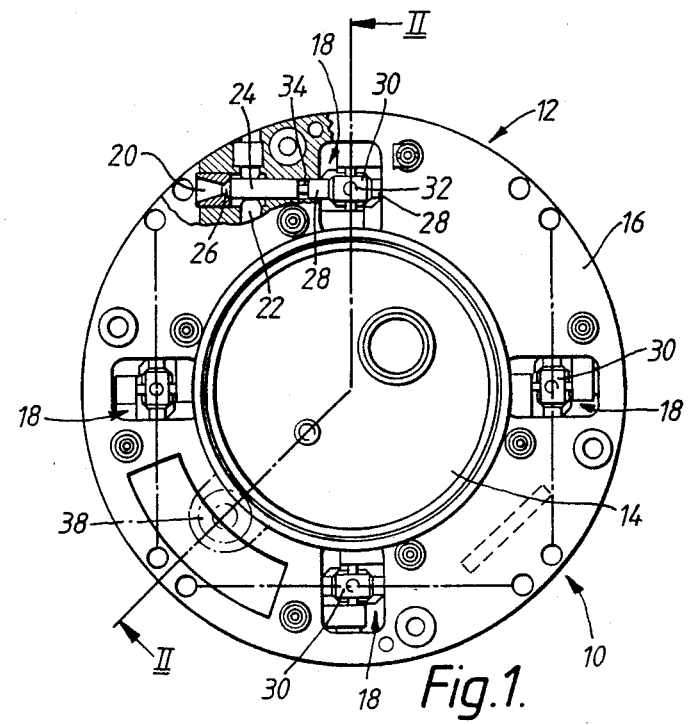
FIG. 1 is a schematic rear view of an actuator assembly of an example of a reaction control system according to this invention.
Figure 2:
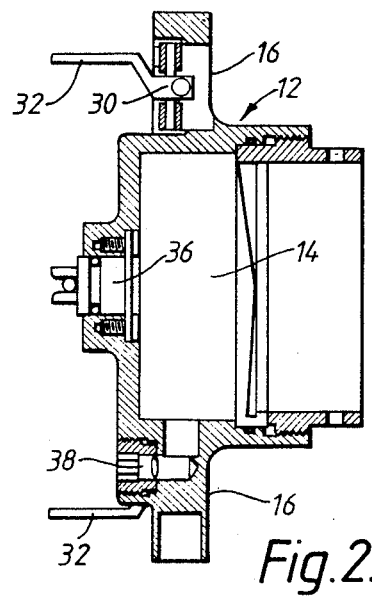
FIG. 2 is a section view of the actuator assembly of FIG. 1 taken on lines II—II.

FIGS. 1 and 2 illustrate an actuator assembly 10 for a reaction control system. The assembly 10 comprises a casing 12 which houses a gas generator 14 and which includes an outer flange 16. The outer flange carries four thruster assemblies 18 equispaced around the periphery of the missile. Each thruster assembly 18 comprises a pair of aligned nozzles 20 connected by conduits 22 to the gas generator 14 and each arranged to exhaust in opposite directions. The flow of gas from gas generator 14 through each nozzle 20 is controlled by means of a piston 24 slidably mounted with respect to the nozzle so as to be movable to vary the effective thrust area of the nozzle and thus the thrust generated. Each piston is continuously movable with respect to the throat of the associated nozzle—i.e. it can assume any position between fully open and fully closed. Each piston is provided with a conical sealing end 26 and a distal end 28. The respective distal ends of the pistons 24 of a pair of nozzles are acted upon by a cam member 30 rotatably secured to the flange 16 and attached to an operating lever 32. Rotation of the cam member causes inverse operation of the pistons, i.e. one piston moves to increase the flow through its associated nozzle as the other piston moves to decrease the flow through its associated nozzle. A spring arrangement 34 is provided between the sealing end 26 and the distal end 28 and is arranged so that in normal operation there is no relative movement between the sealing end and the distal end, but if the sealing end 26 should seize and be prevented from movement, the distal end may move relative to the sealing end 28 against the bias of the spring 34 so that the cam member 30 is not prevented from rotating.

Figure 5:
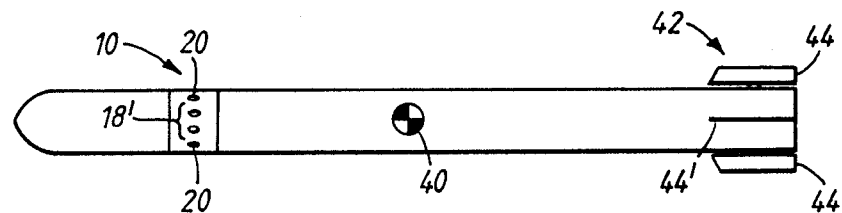
FIG. 5 is a diagrammatic view of an example of a missile incorporating a reaction control system and a fin assembly.

The four thruster assemblies 18 are equispaced around the periphery of the missile so that two assemblies (the upper and lower assemblies as viewed in FIG. 1) lie in spaced planes parallel to the yaw plane and two assemblies (the left hand and right hand assemblies as viewed in FIG.1) lie in spaced planes parallel to the pitch plane. In use, as illustrated in FIG. 5, the actuator assembly illustrated in FIGS. 1 and 2 is mounted forwardly of the centre of gravity of the missile. Hence, when used in unison, the upper and lower assemblies effect control in the yaw sense and the left and right hand assemblies effect control in the pitch sense. If the upper and lower assemblies are not operated to generate the same magnitude of thrust in parallel directions, then a component of roll torque is generated. If the thrust generated by the upper and lower assemblies is equal and opposite then a simple roll torque will be generated. Similar considerations apply to operation of the left and right hand assemblies.

The gas generator may be of any suitable form; in the illustrated embodiment, it takes the form of a hot gas generator which is ignited by means of an igniter 36. A burster disc assembly 38 is provided for safety purposes.

Figure 3:
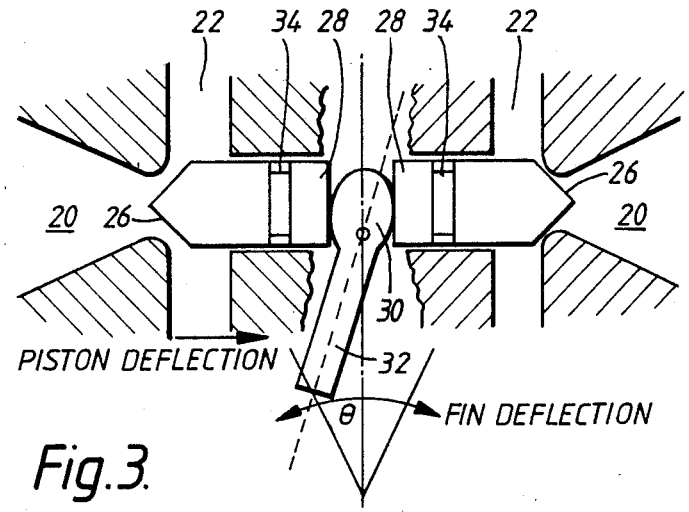
FIG. 3 is a diagrammatic view of the arrangement of one pair of nozzles in the arrangement of FIGS. 1 and 2.

FIG. 3 illustrates schematically a single assembly showing the operating lever 32 and the cam 30. It will be understood that the direction and magnitude of the thrust vector generated by the assembly is dependent on the position of the operating lever 32.

Figure 4:
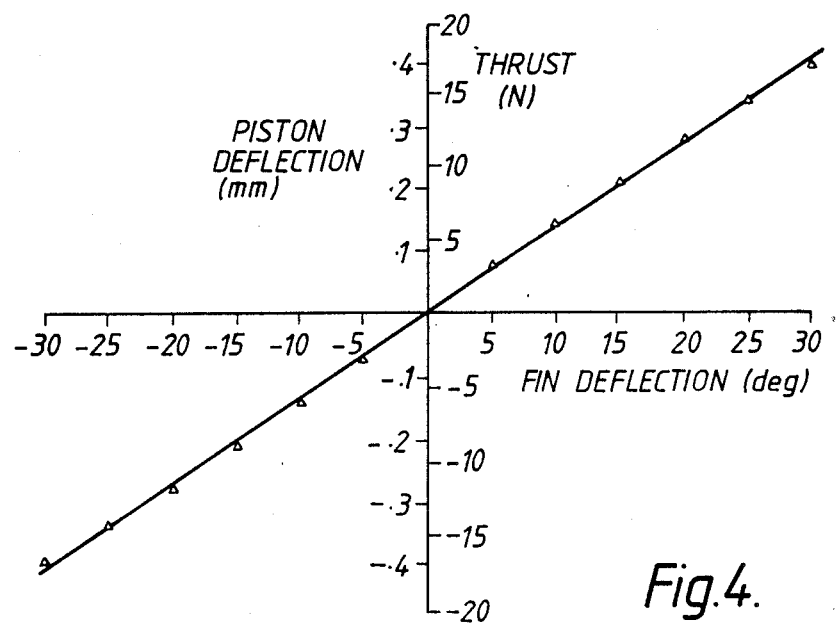
FIG. 4 is a graph illustrating the relationship between piston deflection, thrust, and fin deflection for an example of a missile incorporating a reaction control system and a fin assembly.

FIG. 4 illustrates the variation of the thrust developed with the deflection of the piston; it will be seen that the thrust varies proportionally with movement of the piston. It should be noted that this is for the purposes of illustration only and that other characteristics will result for different designs.

FIG. 5 illustrates a missile with a reaction control assembly 10 located forwardly of the centre of gravity 40 of the missile and an aft fin assembly 42 comprising four movable fins 44 arranged at the aft of a missile. The fins are oriented around the missile body so that operation of one set of diametrically opposed fins in unison effects control in the yaw sense whilst operation of the other set of diametrically opposed fins in unison effects control in the pitch sense. Differential operation of either set of fins allow the fins to effect control in the roll sense.

Figure 6:
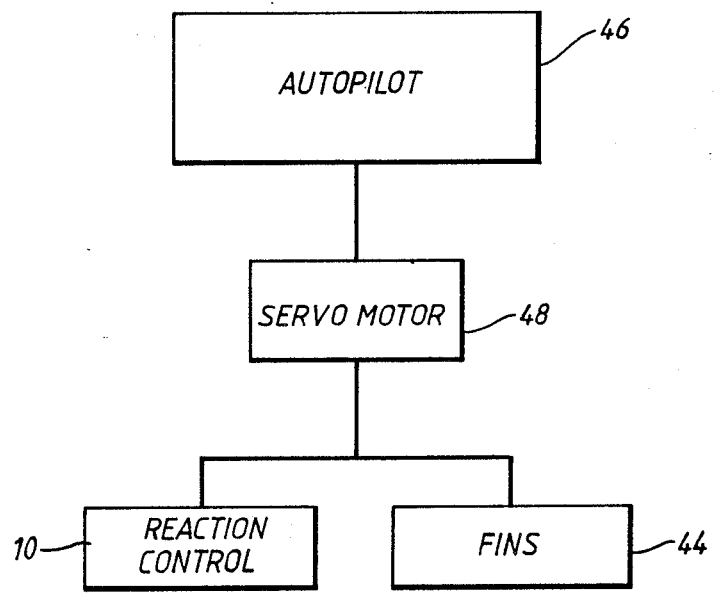
FIG. 6 is a block diagram of the control system of the missile of FIG. 5.

FIG. 6 illustrates a navigation system for the missile of FIG. 5. An autopilot 46 calculates the control movements required for the desired course corrections and controls a servomotor assembly 48 which controls movement of the fins 44 and also movement of the operating levers 32 of the associated thruster assembly. It will be understood that each of the thruster assemblies is operable to impart a control moment which is similar to that imparted by rotation of a fin member when the missile is in normal flight. Thus the control function exerted by thruster assembly 18' is analogous to that exerted by movable fin 44' etc. The thrust developed on deflection of the fin 44 is illustrated in FIG. 4. It will be seen that, as with movement of the pistons of the thruster assemblies, that thrust/movement relationship is essentially linear for this example and that the thrust/movement characteristics for the thruster assembly are similar to those developed by angular movement of the fin.

Thus, by linking the operating levers 32 to a normal fin servo system, the reaction control system may provide a thrust which is proportional to the fin deflections, so enhancing the control effectiveness of the fins. This is particularly useful when the missile is travelling too slowly for the fins to be effective e.g. at launch, or where an extra amount of control is desired e.g. for a terminal manoeuvre. Because of the similarity between the movement/thrust characteristics of the fins and reaction control system this method of control augmentation may be added to a missile with little or no change to the autopilot.

In the arrangements of FIGS. 1 to 6, since the magnitude of the thrust developed can be adjusted across a large, continuous, range of values, the missile "weave" associated with squibs or pulsed thrusters can be avoided.

Where the reaction control system is employed in conjunction with a conventional movable fin assembly, the spring 34 override mechanism in the reaction control system serves an important purpose because it prevents total failure in the event of a failure of the reaction control system, as it enables the movable fin assembly to continue operating.

The spring override mechanism is of particular benefit where two nozzles are operated in back to back fashion by a single actuator as in the arrangement 18 of FIGS. 1 to 6, because in these types of arrangement the mechanism may compensate for slight dimensional inaccuracies of the piston members, the cam mechanism and/or the housing defining the bores in which the pistons slide which might otherwise jam or damage the drive motor when moving towards an end position. The mechanism means that the designer can ensure that the pistons may be moved into engagement with the nozzle throat, thus closing it, without jamming the servo control system or preventing movement of the corresponding fin member.

The reaction gas may be a cold or hot gas and the storage reservoir or gas generator may be integrated with the nozzle units to provide a compact control package. The reaction gas may be bled off the main missile rocket motor; indeed a plurality of thruster assemblies may be inclined rearwards to provide not only lateral control but also the main source of rocket propulsion.

Figure 7:
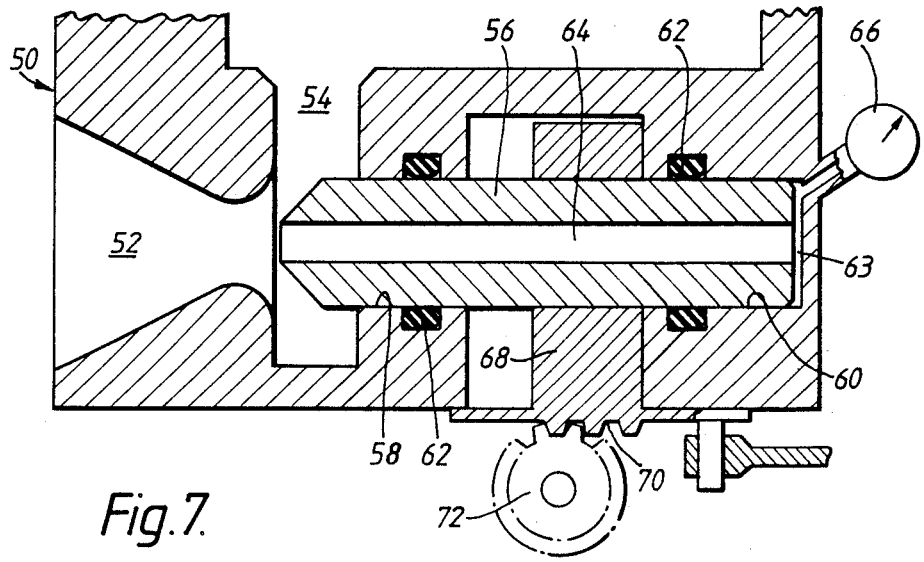
FIGS. 7 and 8 show an example of a control thruster assembly in the open and closed positions respectively.
Figure 8:
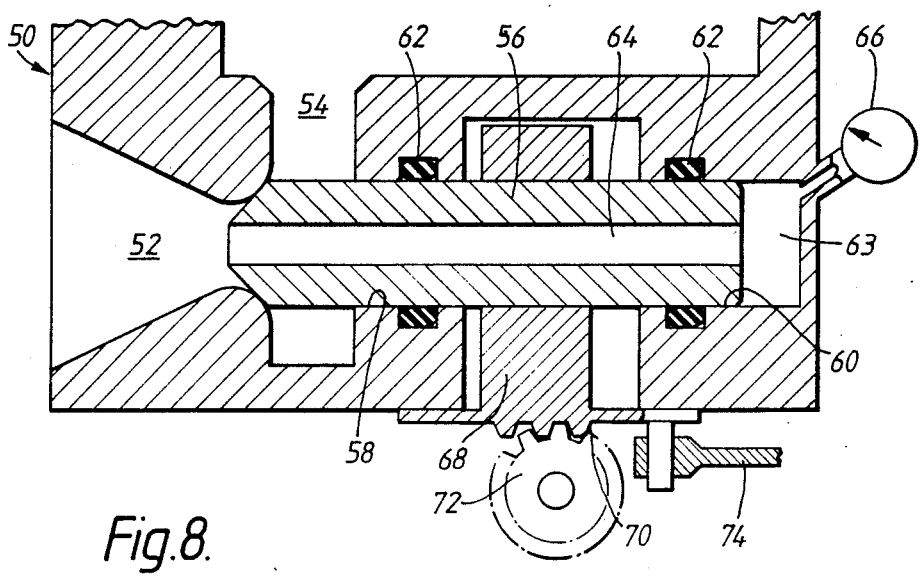
Figure 9:
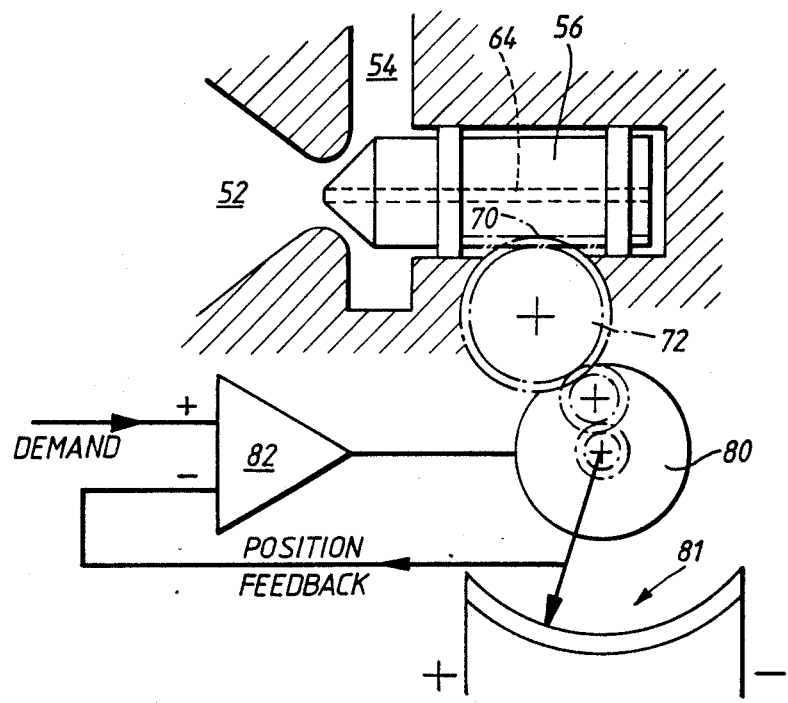
FIG. 9 shows schematically an example of a control thruster assembly configured in a servo loop.

Referring now to the examples illustrated in FIGS. 7 to 9, these are intended to provide a control thruster assembly in which the force or torque required to move the control element is greatly reduced, so that the assembly is suitable for use in flight vechicles such as guided missiles.

FIGS. 7 and 8 illustrate an embodiment of the control thruster assembly in the fully open and fully closed positions respectively. The assembly comprises a housing 50 defining an outlet throat 52 and a fluid supply manifold 54, and a plunger 56 which is slidably located in a pair of spaced bores 58,60 each of which includes a gas seal 62. The bore 60 at the rear of the plunger 56 is closed to define a variable volume chamber 63, together with the rear end of the plunger 56. A pressure balance bore 64 interconnects the two axial end faces of the plunger 56 to tend to equalise the pressure forces acting on the plunger 56.

A pressure transducer 66 may be provided to sense the pressure in the variable volume chamber 63, the sensed pressure being a measure of the pressure of the fluid in the outlet throat 52 and also of the displacement of the plunger 56. Intermediate the bores 58 and 60, the housing 50 is relieved and receives for limited axial movement an actuating lever 68 secured to the plunger 56. The actuating lever 68 includes a rack portion 70 which engages the pinion 72 of a drive motor (not shown) for driving the plunger between the positions shown in FIGS. 7 and 8. A plunger position sensor linkage 74 may be connected to the actuating lever 68 for determining the position of the plunger.

In this arrangement, the thrust can be switched "on" or "off" or modulated by movement of the plunger 56. For a proportional thrust system the drive may be in the form of a servo motor/gear box, whilst for a bang-bang system a stepping motor drive connected directly to the plunger may be used.

An important part of the assembly of FIGS. 7 and 8 is the pressure balance bore 64, which allows the pressure at the outlet throat to be sampled.

The magnitude of the sampled pressure will be a function of the plunger displacement. With this system only a modestly powered servo actuator drive will be required for the plunger as the resultant pressure force acting on the plunger will be low. In the "off" position, ambient pressure will act on both ends of the plunger.

Plunger position data may be determined from a position sensor connected to the position sensor linkage 74 or it may be derived from a pressure transducer 66 which samples the pressure at the outlet throat via the pressure balance bore 64.

For high gas temperature operation, refractory or ceramic materials may be used in the assembly. The gas supply to the thruster assembly may be taken from the main propulsion rocket motor system or from a dedicated hot or cool propellant gas supply. The number of thrusters will be a function of the particular control system required.

It will readily be seen that this arrangement of FIGS. 7 and 8 may be incorporated into the proportional control systems illustrated in FIGS. 1 to 6. Alternatively, it may be incorporated in a bang-bang system.

FIG. 9 is a schematic illustration of a thruster assembly of the type illustrated in FIGS. 7 and 8 configured in a servo-control loop. Many of the component parts are similar and will not be described in detail again. In this arrangement the plunger 56 has an integral rack portion 70 which meshes with a pinion 72 connected via a gear train to an electric motor 80. A potentiometer 81 associated with the electric motor 80 provides a position feedback signal which is supplied to one input of a differential amplifier 82 which controls the motor 80.

The position servo can control a single unit a shown with a pressure balance bore 64 to reduce actuation forces, or two units arranged back-to-back as in the arrangements of FIGS. 1 to 6, where the pressure balance bore would not be necessary. Similarly a servo control loop of the type illustrated in FIG. 9 could be used to drive the cam mechanism of the arrangements of FIGS. 1 to 6.

In the examples of FIGS. 7 to 9, the use of torque motors or gear motors to actuate the pistons means that it may be possible to transmit larger forces which might damage the cam-type arrangements of FIGS. 1 to 6.

It will be understood that the reaction control system described herein may be coupled to operate in tandem with the fin control system or they may operate independently of any fin control system.

We claim:

1. A projectile including a reaction control system, said system including at least one nozzle assembly, said at least one nozzle assembly comprising a housing defining a nozzle outlet means and a bore adjacent said outlet, a piston means located in said bore and movable to open or to close said nozzle outlet means, drive means for moving said piston means and passage means extending through said piston means whereby the pressure at one end of said piston and means is transmitted to the other end thereof.

2. A projectile as claimed in claim 1, further including aerodynamic control surface means for effecting control in at least one of the roll, pitch or yaw senses, and an autopilot including an actuator operable to effect movement of said aerodynamic control surface means to impart control in a given sense and at the same time to effect adjustment of the magnitude of the thrust of the nozzle or nozzles to impart control in the same sense.

3. A reaction control system, said system including at least one nozzle assembly, said at least one nozzle assembly comprising a housing defining a nozzle outlet means and a bore adjacent said outlet, a piston means located in said bore and movble to open or to close said nozzle outlet means, drive means for moving said piston means and passage means extending through said piston means whereby the pressure at one end of said piston means is transmitted to the other end thereof.

4. A reaction control system as claimed in claim 3, said at least one nozzle assembly comprises at least two oppositely directed nozzle assemblies wherein the thrust generated by one nozzle assembly of the pair increases as the thrust generated by the other nozzle assembly decreases.

5. A reaction control system claimed in claim 4, wherein said at least two nozzle assemblies comprise four pairs of nozzle assemblies disposed about an axis, said reaction control system being operable to impart at least one of pitch, yaw or roll control about said axis.

6. A reaction control system according to claim 3, wherein said drive means comprises a continuously variable servo drive system.

7. A reaction control system according to claim 6, wherein position sensor means is associated with said piston means for sensing the position thereof.

8. A reaction control system according to claim 6, wherein pressure transducer means is associated with said piston means for providing a pressure signal representative of the position of said control element.

9. A reaction control system according to claim 3, wherein said at least one nozzle assembly comprises two oppositely directed nozzle assemblies, each oppositely directed nozzle assembly including an associated piston means, and common control member for moving each of said piston means, and lost motion means for coupling said control member and said piston means.

* * * * *